(12) United States Patent
Sung et al.

(10) Patent No.: US 8,189,520 B2
(45) Date of Patent: May 29, 2012

(54) APPARATUS AND METHOD FOR PREAMBLE PSEUDO NOISE CODE ALLOCATION IN BROADBAND WIRELESS COMMUNICATION SYSTEM

(75) Inventors: Ki-Won Sung, Seoul (KR); Soo-Yeul Oh, Seoul (KR)

(73) Assignee: Samsung Electronics Co., Ltd. (KR)

( * ) Notice: Subject to any disclaimer, the term of this patent is extended or adjusted under 35 U.S.C. 154(b) by 966 days.

(21) Appl. No.: 12/026,064

(22) Filed: Feb. 5, 2008

(65) Prior Publication Data

US 2008/0291871 A1    Nov. 27, 2008

(30) Foreign Application Priority Data

Feb. 6, 2007    (KR) .................. 10-2007-0011941

(51) Int. Cl.
*H04W 4/00*    (2009.01)

(52) U.S. Cl. ........ 370/329; 375/259; 375/260; 455/403; 455/422.1; 455/450

(58) Field of Classification Search .......... 370/310–350; 375/259–260; 455/403, 422.1, 450–454
See application file for complete search history.

(56) References Cited

U.S. PATENT DOCUMENTS

| | | | |
|---|---|---|---|
| 2001/0016493 A1* | 8/2001 | Kim et al. ................ | 455/436 |
| 2005/0020264 A1* | 1/2005 | Akao et al. ............... | 455/436 |
| 2005/0272403 A1* | 12/2005 | Ryu et al. ................ | 455/403 |
| 2006/0121903 A1* | 6/2006 | Lee et al. ................ | 455/439 |

FOREIGN PATENT DOCUMENTS

| KR | 1020040047699 | 6/2004 |
|---|---|---|
| KR | 1020050048344 | 5/2005 |
| KR | 1020060047601 | 5/2006 |
| KR | 1020060055864 | 5/2006 |

* cited by examiner

*Primary Examiner* — Hassan Kizou
*Assistant Examiner* — Charles C Jiang
(74) *Attorney, Agent, or Firm* — The Farrell Law Firm, P.C.

(57) ABSTRACT

An apparatus and a method for preamble pseudo noise code allocation in a broadband wireless communication system are provided. The method includes defining an inherent index for each FA, allocating a preamble PN index to base stations using a reference FA index, defining an inherent offset by each FA for remaining FA indexes, and shifting the preamble PN index allocated to the base stations using the reference FA index by the defined offset, and allocating the preamble PN index to base stations using the remaining FA indexes. The price of a system can thus be lowered by reducing a Peak-to-Average Power Ratio (PAPR) of a preamble, increase the number of FAs that a specific amplifier can amplify, and immediately allocate a preamble PN index when adding a new FA during an operation of a system.

8 Claims, 3 Drawing Sheets

| INDEX | IDCELL | SEGMENT | SERIES TO MODULATE (IN HEXADECIMAL FORMAT) |
|---|---|---|---|
| 0 | 0 | 0 | A6F294537B285E1844677D133E4D53CCB1F182DE00489E53E6B6E77065C7EE7D0ADBEAF |
| 1 | 1 | 0 | 668321CBBE7F462E6C2A07E8BBDA2C7F7946D5F69E35AC8ACF7D64AB4A33C467001F3B2 |
| 2 | 2 | 0 | 1C75D30B2DF72CEC9117A0BD8EAF8E0502461FC07456AC906ADE03E9B5AB5E1D3F98C6E |
| 3 | 3 | 0 | 5F9A2E5CA7CC69A5227104FB1CC2262809F3B10D0542B9BDFDA4A73A70460 96DF0E8D3D |

APPARATUS AND METHOD FOR PREAMBLE PSEUDO NOISE CODE ALLOCATION IN BROADBAND WIRELESS COMMUNICATION SYSTEM

PRIORITY

This application claims priority under 35 U.S.C. §119(a) to a Korean patent application filed in the Korean Intellectual Property Office on Feb. 6, 2007 and assigned Serial No. 2007-11941, the contents of which are hereby incorporated by reference.

BACKGROUND OF THE INVENTION

1. Field of the Invention

The present invention relates to an apparatus and a method for preamble Pseudo Noise (PN) code allocation in a broadband wireless communication system, and more particularly to an apparatus and a method for allocating different preamble PN codes to respective Frequency Allocations (FAs) in a base station of a broadband wireless communication system which amplifies a plurality of FAs with one amplifier.

2. Description of the Related Art

The IEEE 802.16e system basically adopts a cellular method and supports a frequency reuse factor of 1. For this reason, it is possible to share an identical frequency with adjacent cells. Therefore, a terminal within the system must be able to identify a base station to which it belongs from adjacent base stations which use an identical frequency. For identification, each base station inserts a preamble Pseudo Noise (PN) code, i.e., its inherent PN code into a preamble of each frame to be transmitted to a terminal.

The number of the preamble PN codes defined in the IEEE 802.16e system reference is 114. Respective preamble PN codes have preamble PN indexes from 0 to 113, and each preamble PN index has an inherent preamble PN code, an ID cell and a segment number as shown in FIG. 1. Each base station is allocated with one of the preamble PN codes and broadcasts it to a terminal. Then the terminal interprets the received preamble PN code and thereby checks an IDcell and a segment number of corresponding base station. Here, the IDcell has 32 different values from 0 to 31, and the segment number has three different values from 0 to 2. Therefore, all preamble PN codes cannot have their inherent combinations of an IDcell and a segment number. Among the 114 preamble PN codes, code 0 through code 95 have their inherent combinations of an IDcell and a segment number, whereas code 96 through code 113 have the same combinations as those of code 0 through code 95.

The preamble PN code is used when a terminal turns on and initially tries to connect to a system, in order to search a base station to perform a communication. The terminal matches a received signal to the 114 preamble PN codes, synchronizes an initial time to the most well-matched preamble PN code, and starts a communication with a base station having the corresponding preamble PN index. The preamble PN code is also used to search an adjacent base station when the terminal needs a handover.

In addition, the preamble PN code transmits an IDcell and a segment number of corresponding base station through a preamble PN index. The IDcell and segment number are important parameters used in a sub-carrier randomization, a sub-channel permutation, a cluster renumbering, a sub-channel renumbering, and so on. A terminal checks a preamble PN index of a base station and thereby obtains an IDcell and a segment number of the corresponding base station.

When an identical preamble PN index is allocated to adjacent base stations, the terminal cannot perform an initial search for a base station. Hence, the preamble PN index must be allocated to each base station in such a way that minimizes a replicated allocation to adjacent base stations. In addition, since the IDcell and the segment number are also important parameters for identifying a base station, they also should be allocated to each base station in such a way that minimizes the replicated allocation to adjacent base stations.

Meanwhile, a Radio Frequency (RF) power amplifier in a broadband wireless communication system is a significant component which takes considerable parts in material cost, space, and power consumption. The power amplifier is classified into a Single Carrier Power Amplifier (SCPA) and a Multi-Carrier Power Amplifier (MCPA) according to a bandwidth of an input signal. In general, the MCPA is more expensive than the SCPA in order to maintain linearity. However, when a system uses a plurality of FAs, using one MCPA may be more economical than using a plurality of SCPAs.

Many methods for allocating a preamble PN index to each base station in a broadband wireless communication system have been proposed. However, those methods are applicable to a system using one FA, and when the methods are directly applied to a system using a plurality of FAs, an identical preamble PN index is allocated to all FAs in a base station. When the base station amplifies each FA by a separate power amplifier, that is, when a separate SCPA is used for each FA, it doesn't cause a problem even though an identical preamble PN index is allocated to the FAs. However, when a plurality of FAs are amplified by one power amplifier, that is, when the MCPA is used, allocation of identical preamble PN index to the FAs may cause a problem.

When an identical preamble PN index is used for a plurality of FAs, an identical preamble PN code is transmitted from preamble symbols to the FAs. That is, all FAs transmit an identical signal. In this case, a Peak-to-Average Power Ratio (PAPR) of a base station is significantly increased as compared to the case when each FA transmits a different signal. In a downlink zone except in a preamble, different signals are transmitted every frame. Therefore, it has little possibility of transmitting an identical signal by different FAs. However, since the preamble transmits always an identical signal, when the preamble PN index values used in respective FAs are identical, the PAPR may be greatly increased. The rise of the PAPR increases an output span in which a power amplifier should maintain linearity, thereby increasing the price of the power amplifier. That is, when a base station operating a plurality of FAs using the MCPA uses an identical preamble PN index for the FAs, the material cost of the power amplifier may be increased due to a rise of the PAPR. Accordingly, it is better to use different preamble PN index values in one base station.

If a system allocates preamble PN indexes to each base station in consideration of a preamble PN index replication for the FAs within a base station as well as of the preamble PN index replication in adjacent base stations, the above-mentioned problem may be solved. One easy way is to divide a preamble PN set by each FA. For example, when a system uses three FAs, the preamble PN index is divided into three groups, and each FA uses only the preamble PN index belonging to one group. However, the number of the preamble PN indexes is 114, and the ID cell and the segment number which are the components of the preamble PN index are just 32 and 3, respectively. Therefore, even when only one FA is used, it is difficult to allocate the preamble PN index without replication among adjacent base stations. Furthermore, if the FA is considered, it becomes more difficult to allocate the preamble PN index, and it may increase the possibility of parameter replication among adjacent base stations.

For this reason, a preamble PN index allocation method in a broadband wireless communication system using a plurality of FAs should satisfy the following two requirements simultaneously. First, a different preamble PN index must be allocated to each FA within a base station. Second, the allocation to respective FAs should not deteriorate an allocation performance of the preamble PN index, IDcell and segment, as compared to the FA allocation in a system using one FA. Accordingly, in order to reduce the price of a power amplifier in a broadband wireless communication system using a plurality of FAs, there is needed a preamble PN index allocation method which does not deteriorate the performance of the preamble PN index allocation to each FA while using different preamble PN indexes for respective FAs in a base station.

SUMMARY OF THE INVENTION

To address the above-discussed deficiencies of the prior art, it is an aspect to provide an apparatus and a method for preamble Pseudo Noise (PN) code allocation in a broadband wireless communication system.

Another aspect of the present invention is to provide an apparatus and a method for allocating different preamble PN codes to respective Frequency Allocations (FA) within a base station in a broadband wireless communication system which amplifies a plurality of FAs by one amplifier.

Still another aspect of the present invention is to provide an apparatus and a method for shifting a preamble PN index allocated to one FA by an inherent offset defined by each FA and thereby allocating preamble PN indexes for remaining FA indexes in a broadband wireless communication system which amplifies a plurality of FAs by one amplifier.

According to an aspect of the present invention, a preamble PN code allocation method in a broadband wireless communication system using a plurality of FAs includes defining an inherent index for each FA, allocating a preamble PN index to base stations using a reference FA index, defining an inherent offset by each FA for remaining FA index, and shifting the preamble PN index allocated to the base stations using the reference FA index by the defined offset and allocating the preamble PN indexes to the base stations using the remaining FA index.

According to another aspect of the present invention, a preamble pseudo noise code allocation apparatus in a broadband wireless communication system using a plurality of FAs includes an FA index determining device for defining an inherent index for each FA, a preamble PN index allocation device for a reference FA index which allocates a preamble PN index to base stations using the reference FA index, and a preamble PN index allocation device for remaining FA index which shifts the preamble PN index allocated to the base stations using the reference FA index by the defined offset and allocates the preamble PN index to base stations using the remaining FA index.

BRIEF DESCRIPTION OF THE DRAWINGS

The above and other objects, features, and advantages of the present invention will become more apparent from the following description when taken in conjunction with the accompanying drawings, in which like reference numerals represent like elements, in which:

FIG. 1 is a diagram illustrating a part of general preamble PN code in a broadband wireless communication system;

DETAILED DESCRIPTION OF EXEMPLARY EMBODIMENTS

Figure 2:
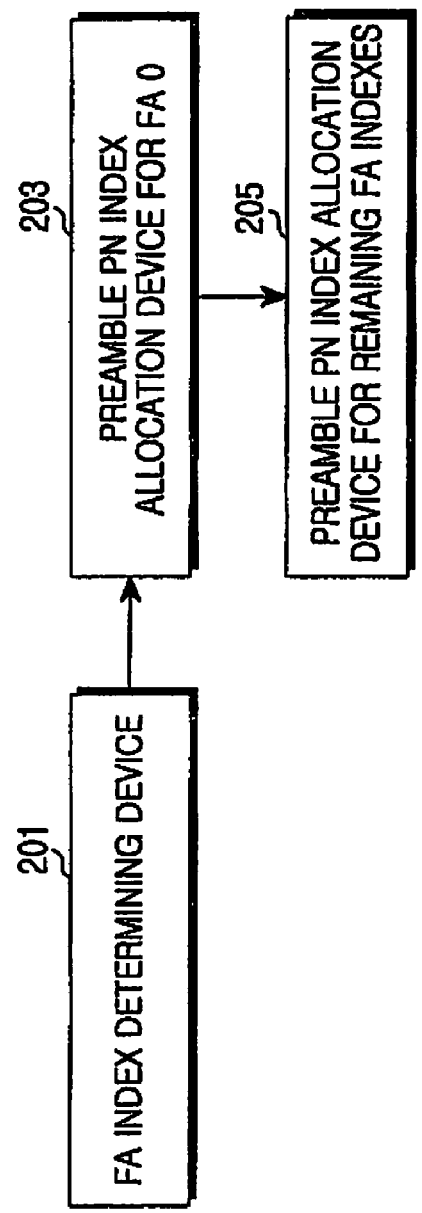
FIG. 2 is a diagram illustrating a configuration of a preamble PN code allocation apparatus in a broadband wireless communication system according to an embodiment of the present invention.
Figure 3:
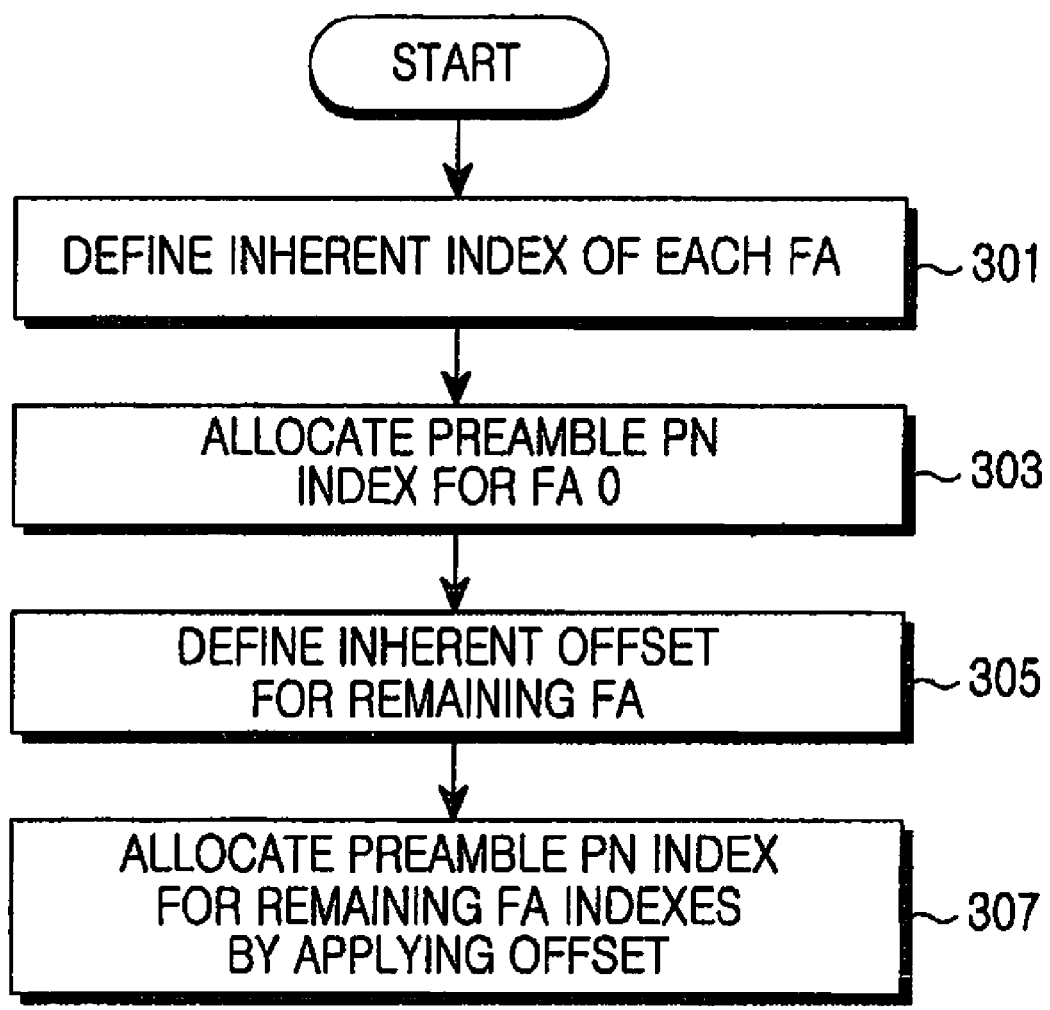
FIG. 3 is a flow chart illustrating a procedure of a preamble PN code allocation in a broadband wireless communication system according to an embodiment of the present invention.

FIGS. 2 and 3, discussed below, and the various embodiments used to describe the principles of the present invention in this patent document are by way of illustration only and should not be construed in any way to limit the scope of the disclosure. Those skilled in the art will understand that the principles of the present invention may be implemented in any suitably arranged wireless communication system.

The present invention is related to an apparatus and a method for preamble Pseudo Noise (PN) code allocation in a broadband wireless communication system.

FIG. 2 is a diagram illustrating a configuration of a preamble PN code allocation apparatus in a broadband wireless communication system according to an embodiment of the present invention. The preamble PN code allocation apparatus comprises a Frequency Allocation (FA) index determining device 201, a preamble PN index allocation device for an FA 0 203, and a preamble PN index allocation device for remaining FA indexes 205.

Referring to FIG. 2, the FA index determining device 201 defines an inherent index for each FA used in a system and outputs the defined FA indexes to the preamble PN index allocation device for FA 0 203.

The preamble PN index allocation device for FA 0 203 allocates preamble PN indexes to base stations using a reference FA index, i.e., an FA index 0 in the same way as that used in a system employing one FA, and outputs an allocation result to the preamble PN index allocation device for remaining FA index 205.

The preamble PN index allocation device for remaining FA indexes 205 defines an inherent offset of each FA for the remaining FA indexes and allocates the preamble PN index for the remaining FA indexes according to the defined offset.

FIG. 3 is a flow chart illustrating a procedure of a preamble PN code allocation in a broadband wireless communication system according to an embodiment of the present invention.

Referring to FIG. 3, the preamble PN code allocation apparatus defines an inherent index for each FA used in a system in step 301. Here, the FA index may not be related with a physical frequency. For example, a minimum value of the FA index may be set as 0, and an FA index which increases by 1 may be allocated to each FA. That is, when N FAs are used in a system, indexes from FA 0 to FA N−1 may be allocated to the respective FAs.

Thereafter, the preamble PN code allocation apparatus allocates a preamble PN index to base stations using a reference FA index, i.e., an FA index 0 in the same way as that used in a system using one FA in step 303. Here, the preamble PN index allocation may be performed in various ways, and the descriptions on those ways will not be discussed in the present invention for conciseness.

Thereafter, the preamble PN code allocation apparatus defines an inherent offset by an FA for the remaining FAs in step 305. For example, the inherent offset by an FA may be defined by the FA index defined in step 301, or in various other ways.

Then, the preamble PN code allocation apparatus allocates a preamble PN index to the base stations using the remaining FA indexes according to the offset in step 307. For example, by shifting a preamble PN index for the FA index 0 with the inherent offset defined by an FA, the preamble PN code allocation apparatus can allocate the preamble PN index to the base stations using corresponding FA index. In this case, a modulo operation is implemented for the shifted value with the number of preamble PN indexes to make the shifted value not greater than a maximum value of the preamble PN index.

Here, a $PN_i$, which is the preamble PN index for the base stations using an FA index i, may be allocated using Equation 1.

$$PN_i = (PN_0 + i) \bmod N_{PN} \quad (1)$$

Here, mod refers to a modulo operation, and the $PN_0$ denotes a preamble PN index for the base stations using the FA index 0. In addition, the $N_{PN}$ is the number of the preamble PN indexes, which is 114 in the IEEE 802.16e standard.

Thereafter, the preamble PN code allocation apparatus completes a computation according to the present invention.

The preamble PN index is associated with the IDcell and the segment, and thus if any one value of the IDcell and the segment is changed, the preamble PN index is changed accordingly. Hence, an IDcell or a segment for the FA index i within a base station may be applied to an embodiment of the present invention, and thereby a method for changing the preamble PN index is also possible.

Here, an $IDcell_i$, which is the IDcell for the FA index i may be allocated by using Equation 2, and a $Segment_i$, which is the segment for the FA index i, may be allocated by using Equation 3.

$$IDcell_i = (IDcell_0 + i) \bmod N_{IDcell} \quad (2)$$

Here, the $N_{IDcell}$ is the number of the IDcells, and is 32 in the IEEE 802.16e standard.

$$Segment_i = (Segment_0 + i) \bmod N_{Segment} \quad (3)$$

Here, $N_{Segment}$ refers to the number of the segments, and is 3 in the IEEE 802.16e standard.

As described above, an embodiment of the present invention ensures that different preamble PN indexes are applied to respective FAs in a base station by applying an offset to the preamble PN index by an FA. In addition, since it applies an allocation result of the preamble PN index for one FA to other FAs, the allocation performance of the preamble PN index is not deteriorated even though the number of the FAs is increased.

As discussed above, by providing an apparatus and a method for allocating different preamble PN codes to respective FAs in a base station of a broadband wireless communication system which amplifies a plurality of FAs by one power amplifier, the present invention can ensure a preamble PN index allocation performance identical to that of a system using single FA, and decrease a PAPR of the preamble. A power amplifier takes a greater part in the material price of a system, and if the PAPR that the power amplifier must manage is increased, the price of the amplifier is significantly increased, resulting in the rise in the material price of the system. Therefore, the present invention has advantages of lowering the price of a broadband wireless communication system using a plurality of FAs and increasing the number of FAs that a specific amplifier can amplify. In addition, according to the present invention, if a preamble PN index is allocated only for one FA, the preamble PN indexes are automatically allocated to all other FAs by a simple calculation. Therefore, there is no additional burden for the PN index allocation in a system using a plurality of FAs. Lastly, if an inherent index is allocated to each FA, the PN index of corresponding FA is automatically determined. Therefore, when adding a new FA during an operation, the system can immediately allocate a PN index.

Although the present invention has been described with an exemplary embodiment, various changes and modifications may be suggested to one skilled in the art. It is intended that the present invention encompass such changes and modifications as fall within the scope of the appended claims.

What is claimed is:

1. A preamble Pseudo Noise (PN) code allocation method employing a plurality of Frequency Allocations (FAs), the method comprising:
   determining an index for each of a plurality of FAs, at an FA index determining device;
   allocating a first of a plurality of preamble PN indexes to a first FA at a preamble PN index allocation device, wherein each of the plurality of preamble PN indexes corresponds to a different PN code;
   determining offsets between an index of the first FA and each remaining FA of the plurality of FAs at a preamble PN index allocation device for remaining FA indexes; and
   allocating preamble PN indexes to the remaining FAs, wherein each preamble PN index is shifted from the first preamble PN index by an amount based on an offset of its corresponding remaining FA index, and wherein a different preamble PN index is allocated to each FA; and
   transmitting signals from the base station over the plurality of FAs having corresponding allocated preamble PN indexes.

2. The method of claim 1, wherein determining the index for each FA comprises:
   allocating an index to an FA; and
   taking the index allocated to the first FA as a minimum value and allocating FA indexes which increase by 1, respectively, to each of the remaining FAs.

3. The method of claim 1, wherein a modulo operation is implemented for a shifted value with the number of the preamble PN indexes to make the shifted value not greater than a maximum value of the preamble PN index.

4. The method of claim 1, wherein the preamble PN indexes for the remaining FA indexes are allocated by:

$$PN_i = (PN_0 + i) \bmod N_{PN}$$

wherein the $PN_i$ is a preamble PN index of an FA index i, mod is a modulo operation, the $PN_0$ is a preamble PN index for the first FA, and the $N_{PN}$ is the number of the preamble PN indexes.

5. A base station employing a plurality of Frequency Allocations (FAs), the base station comprising:
   an FA index determining device for determining an index for each of a plurality of FAs;
   a preamble PN index allocation device for allocating a first of a plurality of preamble PN indexes to a first FA, wherein each of the plurality of preamble PN indexes correspond to a different PN code; and
   a second preamble PN index allocation device for determining offsets between an index of the first FA and each remaining FA of the plurality of FAs, allocating preamble PN indexes to the remaining FAs, wherein each preamble PN index is shifted from the first preamble PN index by an amount based on an offset of its corresponding remaining FA index, and wherein a different preamble PN index is allocated to each FA.

6. The base station of claim 5, wherein the FA index determining device allocates an index to the first FA, takes the index allocated to one FA as a minimum value, and allocates FA indexes which increase by 1, respectively, to each of the remaining FAs.

7. The base station of claim 5, wherein the second preamble PN index allocation device for remaining FA indexes implements a modulo operation for the shifted value with the number of the preamble PN indexes to make the shifted value not greater than a maximum value of the preamble PN index.

8. The base station of claim 5, wherein the second preamble PN index allocation device for remaining FA indexes allocates the preamble PN index for remaining FA indexes by:

$$PN_i = (PN_0 + i) \bmod N_{PN}$$

wherein the $PN_i$ is a preamble PN index of an FA index i, mod is a modulo operation, the $PN_0$ is a preamble PN index of the first FA, and the $N_{PN}$ is the number of the preamble PN indexes.

* * * * *